(12) United States Patent
Campbell et al.

(10) Patent No.: US 6,670,012 B2
(45) Date of Patent: Dec. 30, 2003

(54) MULTI-COLORED COVERSTOCK

(75) Inventors: Ewen Anthony Campbell, Winchester, VA (US); David Robert Brillhart, Mount Jackson, VA (US); Dennis James Bromley, Winchester, VA (US); Addam Perry Randolph, Martinsburg, WV (US); Gregory Branson Ratlief, Winchester, VA (US)

(73) Assignee: PolyOne Corporation, Avon Lake, OH (US)

( * ) Notice: Subject to any disclaimer, the term of this patent is extended or adjusted under 35 U.S.C. 154(b) by 29 days.

(21) Appl. No.: 10/100,830

(22) Filed: Mar. 18, 2002

(65) Prior Publication Data
US 2003/0175467 A1 Sep. 18, 2003

(51) Int. Cl.[7] .................................................. B32B 3/10
(52) U.S. Cl. .............................. 428/60; 428/57; 428/61; 428/58; 428/158; 428/159; 428/319.3; 428/319.7; 428/319.9; 428/151
(58) Field of Search .............................. 428/58, 60, 61, 428/57, 319.3, 319.7, 319.9, 151, 158–160; 156/304.3, 304.5, 304.6; 264/245; 296/146.7

(56) References Cited

U.S. PATENT DOCUMENTS

| 3,075,862 A | 1/1963 | Hoyer ........................ 154/45.9 |
| 5,262,108 A | 11/1993 | Minke et al. |
| 5,328,349 A | 7/1994 | Minke et al. |

FOREIGN PATENT DOCUMENTS

| EP | 0 988 954 | 8/1999 |
| GB | 2176743 | 1/1987 |

Primary Examiner—Alexander S. Thomas
(74) Attorney, Agent, or Firm—Walker & Jocke; John H. Hornickel (57) ABSTRACT

A process for producing a multicolored coverstock (10, 20, 72) providing at least two thermoplastic or thermoplastic olefin sheets (12, 14, 58). Each of the sheets includes a different color. The process includes directing the sheets into a position where the edges (24, 26) of the sheets overlap. The sheets are laminated together and are laminated to a foam substrate (22, 60) by directing the sheets and the foam substrate through an embossing nip (72). The embossing nip is further operative to impart an embossed surface in the sheets (18). The resulting laminated coverstock may be used in vacuum forming, low pressure molding, and compression molding of interior trim parts of automobiles and other vehicles.

17 Claims, 7 Drawing Sheets

MULTI-COLORED COVERSTOCK

TECHNICAL FIELD

This invention relates to a process for producing multi-colored coverstocks for interior trim parts of vehicles. Specifically this invention relates to a system and process for laminating and embossing two differently colored TPO film sheets to a foam substrate.

BACKGROUND ART

Many vehicles such as automobiles have molded parts in their passenger areas which have desirable cosmetic appearances. A common type of cosmetic feature formed on many interior surfaces of automobiles includes an embossed coverstock or skin. Embossed skins may include a raised or recessed grain which resembles an animal hide such as leather. Molded parts with embossed skins may be found on dashboards, doors and other interior portions of an automobile or other vehicle.

In general the embossed skins of many automotive interior parts are formed from a colored thermoplastic laminate which is bonded to a cushioned substrate such as a foam. These skins are generally comprised of a single color. However, for cosmetic purposes, there exists a need for such skins that have two or more adjacent top surfaces which have different colors. Prior art methods for manufacturing such multicolored skins involve the use of specialized molds. Such molds include multiple zones which are separated by partitions positioned at the intended seam between differently colored skin surfaces. Each differently colored skin surface is formed in a different one of the zones of the mold. An example of such a process for producing multicolored surfaces is shown in U.S. Pat. No. 5,262,108 issued Nov. 16, 1993.

Although such methods produce a uniform seam in the location of the partition, the resulting seam includes a visible gap between the differently colored skin surfaces. Such a gap is often cosmetically undesirable for many automobile interior applications. Further the resulting multicolored surface is structurally weaker in the location of the seam between the differently colored skin surfaces than corresponding mono-color skins without such gaps. Consequently, there exists a need for a system and process of producing multicolored skin surfaces which do not include a visible gap between adjacent, differently colored surfaces. There further exists a need for a system and process of producing multicolored skin surfaces which have gapless seams between differently colored surfaces. There further exists a need for a system and process of producing multicolored skin surfaces which have structurally stronger seams joining differently colored surfaces.

DISCLOSURE OF INVENTION

It is an object of the exemplary form of the present invention to provide a system and process for forming a thermoplastic coverstock.

It is a further object of the exemplary form of the present invention to provide a system and process for forming a multicolored thermoplastic coverstock.

It is a further object of the exemplary form of the present invention to provide a system and process for forming an embossed multicolored thermoplastic coverstock.

It is a further object of the exemplary form of the present invention to provide a system and process for forming a multicolored thermoplastic coverstock which includes a uniform and cosmetically appealing seam between differently colored adjacent surfaces of the coverstock It is a further object of the exemplary form of the present invention to provide a system and process for forming a multicolored thermoplastic coverstock which does not include a gap between differently colored adjacent surfaces of the coverstock.

Further objects of the present invention will be made apparent in the following Best Modes for Carrying Out Invention and the appended Claims.

The foregoing objects are accomplished in an exemplary embodiment of the invention by a post embossing and laminating process which is operative to form a multicolored sheet for use as an interior trim coverstock or skin for interior automotive parts. Examples of such interior automotive parts include doors, dashboards, instrument panels, walls, roofs, seating or any other interior part or portion of an automobile or other vehicle which may be covered with a skin. The exemplary process of the present invention is operative to thermally laminate two or more differently colored thermoplastic olefin (TPO) film sheets together. In addition the exemplary embodiment of the present invention is operative to thermally laminate the two or more TPO film sheets to a flexible and soft substrate such as an olefin foam. Further, the exemplary embodiment of the present invention is operative to thermally emboss the two or more TPO sheets with a grain pattern.

The exemplary post embossing and laminating process is operative to form an exemplary multicolored coverstock by passing the two or more TPO sheets and an olefin foam through a series of heated rolls at designated speeds and gaps to achieve the desired product characteristics. In one exemplary embodiment, the process includes providing two or more feed rolls of TPO film sheets, where each sheet has a different cosmetic surface characteristic such as different coloring or other visually distinct quality. The exemplary process further includes providing a substrate sheet such as a foam, fabric or textile backing.

In the exemplary embodiment of the process, the sheets are unwound from the rolls and are directed through an accumulator. The accumulator is operative to compensate for variations in the processing rate of the system by storing and releasing excess unwound film sheets as is needed. In the exemplary process both the sheets and the foam substrate are directed through a plurality of heated rolls. The output of the sheets from the heated rolls is directed through a spreader bar which is reversed to cause the sheets to partially overlap.

In the exemplary embodiment, the partially overlapped sheets are directed through an oven. The oven is operative to raise the temperature of the sheets to a point that is suitable for lamination to the substrate. The output of the overlapped sheets from the oven is directed through an embosser roll system along with the substrate. The embosser roll system is operative to apply sufficient pressure to the overlapped sheets and foam substrate, to laminate or otherwise bond the sheets and the substrate foam together. In addition the embosser roll includes an embossing surface which is operative to impart an embossed grain into the top surface of the overlapped sheets. The resulting embossed coverstock is passed through a series of cooling rolls and is wound on a roll by a winder.

BEST MODES FOR CARRYING OUT INVENTION

Figure 1:
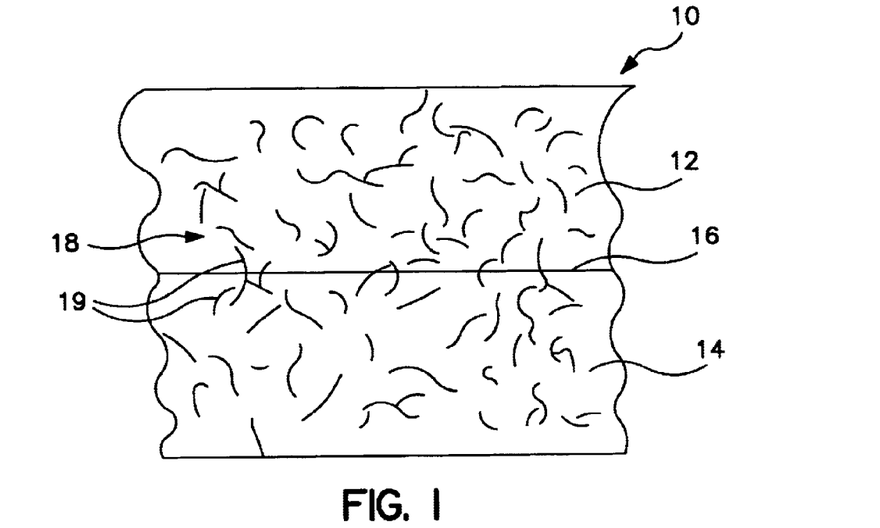
FIG. 1 is a top plan view representative of a multicolored coverstock which is generated by an exemplary embodiment of the system and process of the present invention.

Referring now to the drawings and particularly to FIG. 1, there is shown therein an example of a multicolored coverstock or skin which is produced from an exemplary embodiment of the present invention. The skin includes at least two adjacent film sheets 12 and 14. Each of the sheets has a different color or other visually distinctive characteristic. In the exemplary embodiment the joint or seam 16 between the adjacent sheets may be generally linear without visually discernable gaps or grooves between the sheets 12, 14. The coverstock 10 of the exemplary embodiment may further be produced with an embossed grain 18 in the upper surfaces of the sheets 12 and 14. The exemplary embossed grain pattern 18 may include an uninterrupted pattern comprised of individual raised or recessed features 19 which transverse the seam 16 rather than terminating at the seam 16.

In the exemplary embodiment the sheets 12 and 14 may be comprised of a thermoplastic olefin (TPO). TPOs are polypropylene resins modified with elastomers to improve certain characteristics of the film such as vacuum formability and grain retention. The polypropylene resins may be modified by mixing them with an EPDM or EPR elastomer and cross linking the elastomer. The polypropylene may also be modified in the reactor as it is being produced. The end result of modifying the polypropylene is to add an amorphous rubber phase and reduce the crystalinity of the polypropylene.

In alternative embodiments the sheets 12 and 14 may be comprised of other thermoplastic materials including a polyvinylchloride (PVC) or any other thermoplastic material which is capable of: being laminated to a substrate such as a foam or textile; retaining an embossed surface pattern; and being vacuum formed or low pressure molded to form a part.

Figure 2:
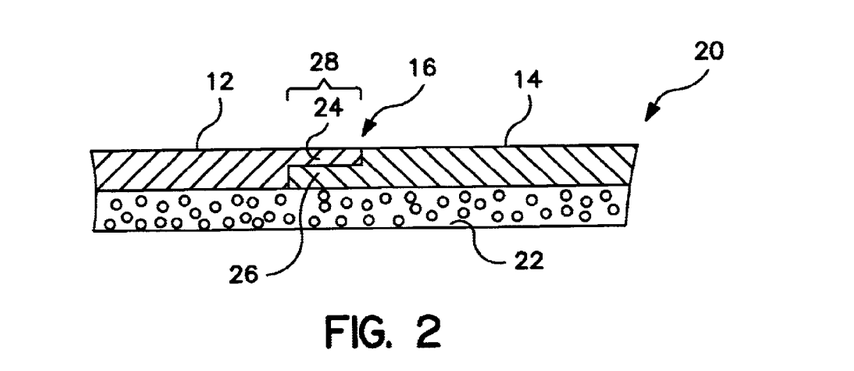
FIG. 2 is a side cross-sectional view representative of the multicolored coverstock.

FIG. 2 shows a cross-sectional, side view of the multicolored coverstock 20. The coverstock may include a substrate material 22 such as a foam or textile. In one exemplary embodiment the substrate 22 may be comprised of a cross-linked polyethylene with a foam density of about 6.0 pcf. The polyolefin foam may be cross linked polyethylene, cross linked polypropylene or blends of polyethylene and polypropylene cross linked. Each of sheets 12 and 14 may be comprised of either the same type of TPO material or different types of TPO materials which are compatible with each other for purposes of being heat sealed together.

In one exemplary embodiment the sheets 12 and 14 may have thicknesses of about 0.6 mm and the foam substrate may have a thickness of about 1.0 mm. However, in alternative exemplary embodiments other thickness of the sheets and substrate may be used to produce a coverstock with sufficient rigidity and flexibility desired for the intended interior trim application. As shown in FIG. 2, a portion 24 of sheet 12 overlaps a portion 26 of sheet 14. In one exemplary embodiment, this overlapped region may have a width of about 10–20 mm. However, alternative exemplary embodiments may include other widths for the overlapped region including overlapped regions with widths of about 2–3 mm.

Figure 3:
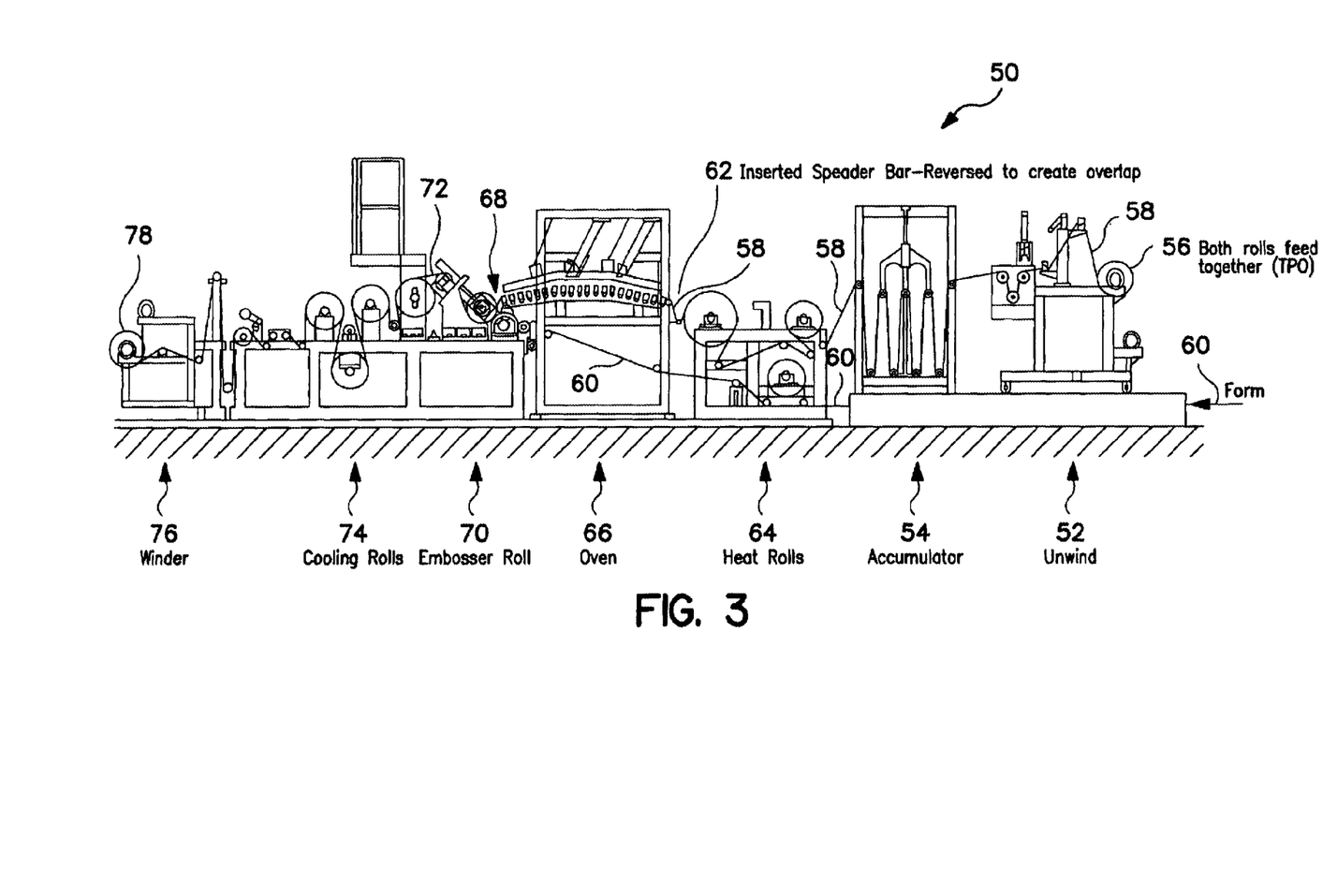
FIG. 3 is a schematic view representative of the exemplary embodiment of a system and process for generating a multicolored coverstock.

FIG. 3 shows an exemplary embodiment of a post embossing and laminating system 50 which may be used generate the exemplary coverstock shown in FIGS. 1 and 2. The system 50 may include an unwinding section 52 which is operative to unwind two or more rolls 56 of TPO sheets 58 or other coverstock laminates. In the exemplary embodiment, the sheets may be unwound from the rolls adjacent to each other. A reversed spreader 62 further along in the process may be employed to cause the sheets to partially overlap prior to lamination. In alternative exemplary embodiments, the rolls may be positioned in one or more unwinding sections such that the sheets are overlapped upon being unwound from the rolls. In a further exemplary embodiment the rolls may be unrolled in an overlapped orientation with a vertical gap between them. Such vertically separated sheets may then be brought together prior to lamination.

In the exemplary embodiment, the unwound sheets may be directed through an accumulator 54 which is operative to take up slack in each of the unwound sheets. The unwound sheets 58 and a substrate 60 such as a foam backing may be directed through a plurality of heat rolls 64. After being passed through the heat rolls 64, the sheets may be directed to a position in which one of the sheets partially overlaps an adjacent one of the sheets. For example, in an exemplary embodiment, the sheets may be moved into an overlapped position with a reversed spreader bar 62. In alterative embodiments, the sheets may be overlapped initially or soon after being unwound from the rolls 56.

After being placed into an overlapped position, the sheets may be directed through an oven 66. The oven 66 is operative to increase the temperature of the sheets to a temperature suitable for lamination of the sheets to each other and to a substrate. Upon exiting the oven 66, the exemplary process may be operative to direct the overlapped sheets 58 and the substrate 60 through an embossing nip 68 of an embosser roll system 70. The exemplary embossing nip 68 is operative to apply sufficient pressure to laminate the overlapped sheets together and to the substrate 60. In addition, as lamination of the sheets and substrate takes place, the exemplary embossing nip may be further operative to impart an embossed pattern into the overlapped sheets. The resulting output of the embosser roll 70 may include a multicolored embossed coverstock 72 comprised of the TPO sheets laminated to the foam backing 60. The coverstock 72 may then be passed through a plurality of cooling rolls 74 and wound on a roll 78 by a winder section 76.

In further alternative exemplary embodiments, the sheets 58 and/or the substrate 60 may be formed by an extruding process prior to being heat sealed and embossed in the described exemplary post embossing and laminating process. Also, as will be discussed in further detail below, alternative exemplary embodiments of the present invention may include thermoplastic sheets which are notched or thinned in the location of the overlap portion prior to being laminated.

Figure 11:
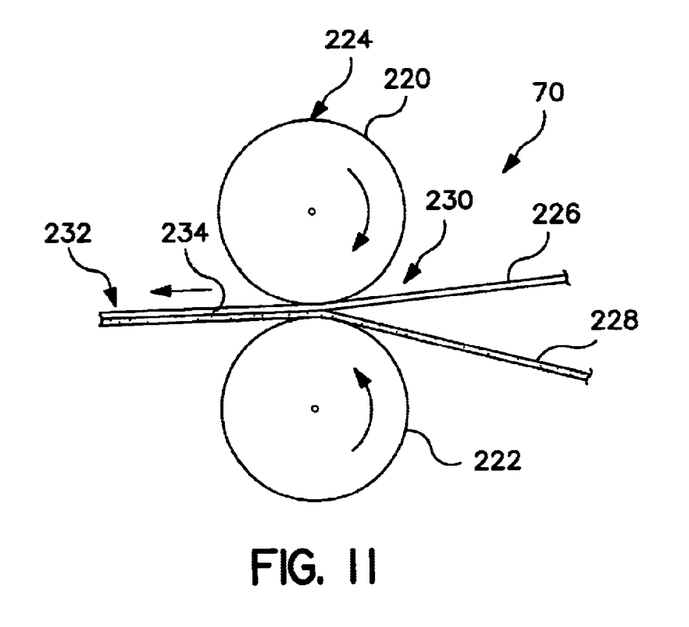
FIG. 11 is a schematic view representative of an exemplary embosser roll system.

FIG. 11 shows an example of the embosser roll system 70. The embosser roll system includes an embosser roll 220 and a backup roll 222. The embosser roll includes a non-smooth outer surface 224 with a three dimensional pattern that corresponds to the mirror image of the desired grain pattern for the coverstock. The backup roll 222 may include a generally smooth surface and may be comprised of a Teflon or other heat resistant rubber material.

As the overlapped TPO sheets 226 and foam substrate 228 pass through the gap between the embosser roll and the backup roll, the pressures within the embossing nip 230 are operative to laminate the overlapped sheets 226 together and to the foam substrate. In the same pass, the outer surface 224 of the embosser roll 220 is operative to impart an uninterrupted grain pattern into the outer surface 232 of the coverstock which spans both of the overlapped and laminated sheets 234.

Figure 4:
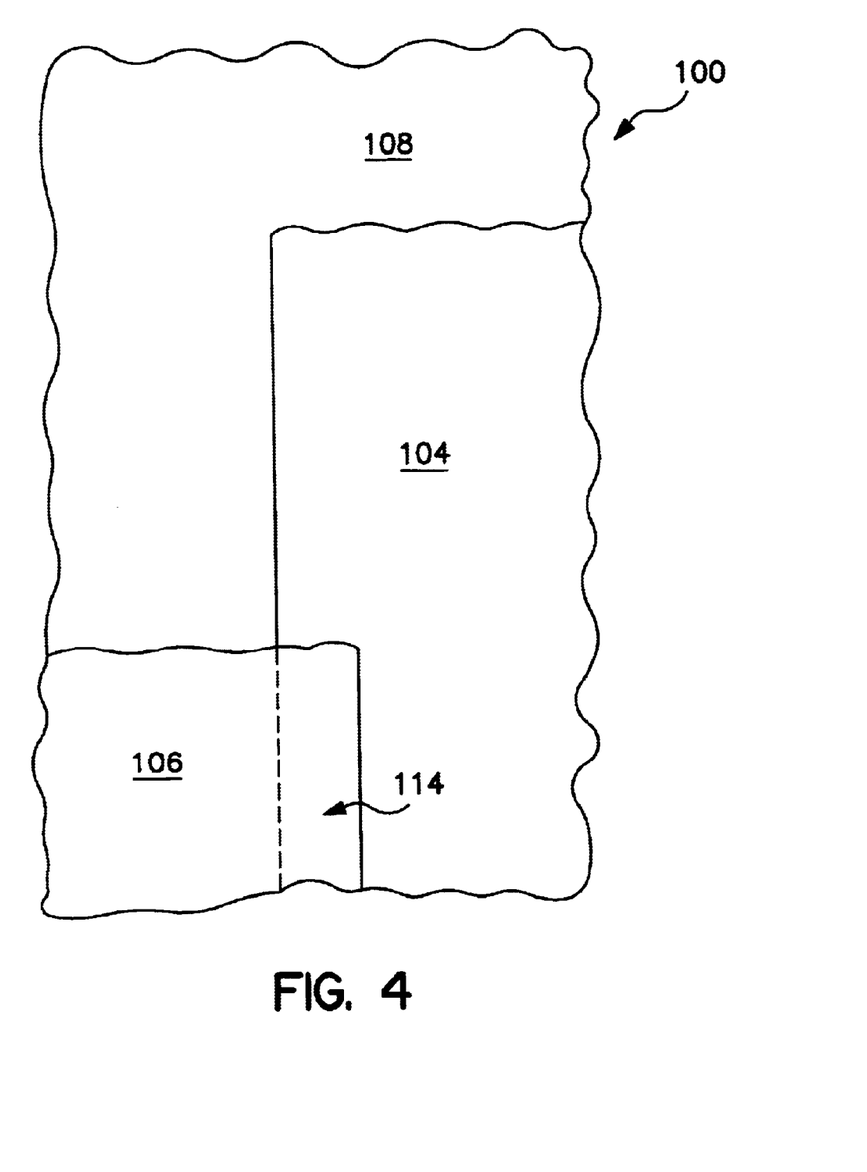
FIG. 4 is a top view representative of a multicolored coverstock.
Figure 12:
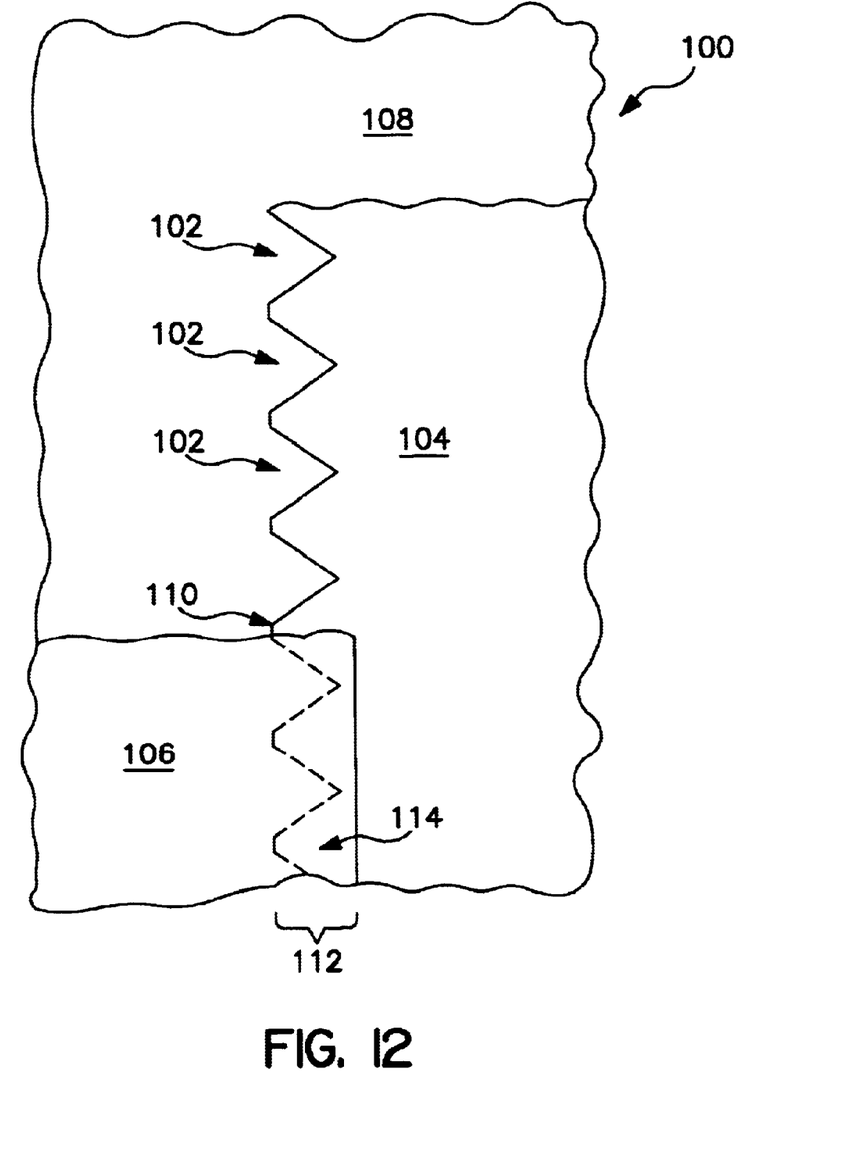
FIG. 12 is a top plan view representative of a multicolored coverstock which includes at least one film sheet which is notched in the overlapped region.

FIG. 4 shows a top view of an exemplary embodiment of a coverstock 100 generated by the exemplary process of the present invention. The exemplary coverstock 100 may include a foam substrate 108 with two overlapped TPO sheets 104 and 106 laminated thereto. The TPO sheets 104 and 106 are shown with cut-out portions which reveal the relative positions of the sheets in the overlapped region 114. FIG. 12 shows an alternative embodiment of the coverstock 100. Here, the bottom sheet 104 of the overlapped TPO sheets may include a plurality of notches 102 in the edge 110 of the sheet 104 which are overlapped by the upper sheet 106. The exemplary notches 102 may extend into the sheet 104 a distance which is less than the width 112 of the overlapped region 114. In another alternative exemplary embodiment the bottom TPO sheet 104 may include slits rather than notches.

Figure 8:
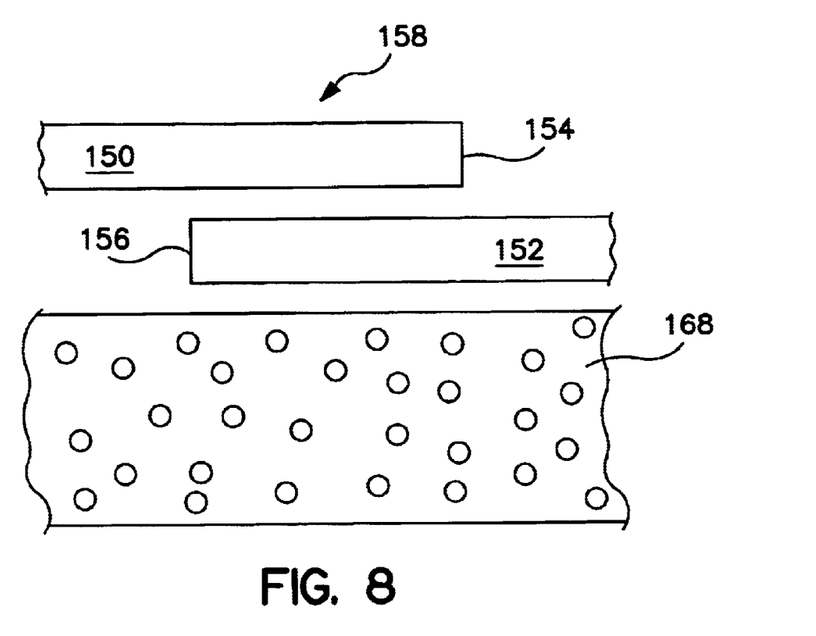
FIG. 8 is a side cross-sectional view showing the layers of a multicolored coverstock prior to being laminated and embossed.
Figure 9:
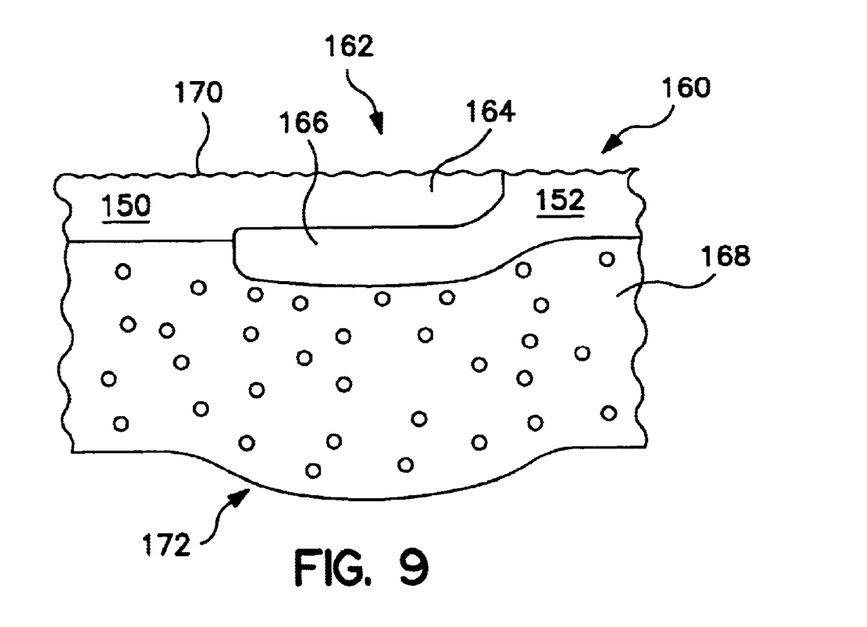
FIG. 9 is a side cross-sectional view showing the layers of a multicolored coverstock after being laminated and embossed.

FIG. 8 shows a cross-sectional view of an exemplary arrangement of TPO sheets 150, 152 prior to lamination and embossing. Here the TPO sheets may include generally vertical edges 154, 156 in an overlapped region 158. FIG. 9 shows a cross-sectional view of the TPO sheets 150, 152 after passing through the post embossing and laminating system 50. Here the resulting coverstock 160 includes an overlapped region 162 in which the ends 164, 166 of the TPO sheets have been pressed together and laminated to a foam substrate 168. The top outer surfaces 170 of the coverstock 160 include an uninterrupted embossed surface which spans across both TPO sheets 150, 152. In this described embodiment, the coverstock 160 is generally thicker in the overlapped region 162 and as a result the foam substrate 168 may bulge downwardly 172. In further embodiments, the embossed surface 170 may include an upwardly projecting bulge in the overlapped region.

Figure 5:
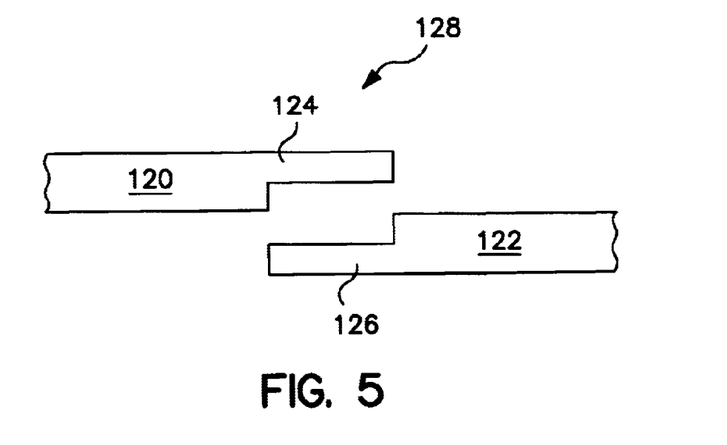
FIG. 5 is a side cross-sectional view showing overlapped sheets with dovetailed edges in the area of the overlapped region.
Figure 6:
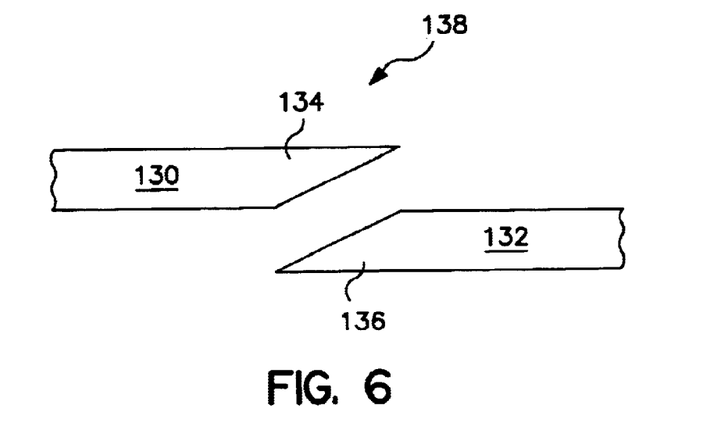
FIG. 6 is a side cross-sectional view showing overlapped sheets in which an upper sheet has a tapered edge in the area of the overlapped region.
Figure 7:
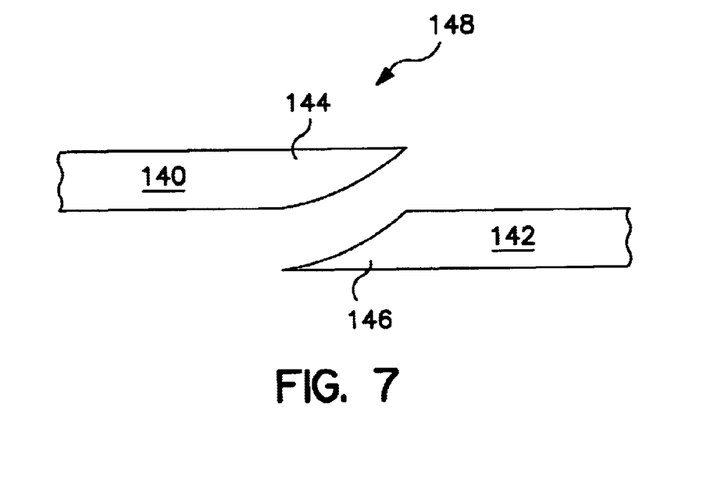
FIG. 7 is a side cross-sectional view showing overlapped sheets with corresponding convex and concave edges in the area of the overlapped region.

Alternative embodiments of the coverstock may be produced without bulges in the overlapped region by thinning one or more of the edges of the overlapped TPO sheets. FIGS. 5–7 show cross-sectional views of further alternative exemplary embodiments of TPO sheets which may be used to minimize the formation of bulges in the exemplary coverstocks of the present invention. Here at least one of the TPO sheets may include a relatively thinner edge in the region of overlap of the two sheets prior to passing through the post embossing and laminating system 50. As shown in FIG. 5, the TPO sheets 120, 122 may include dovetailed edges 124, 126 in the overlapped region 128. As shown in FIG. 6, the TPO sheets 130, 132 may include mirrored tapered edges 134, 136 in the overlapped region 138. As shown in FIG. 7 the TPO sheets 140, 142 may include corresponding concave and convex edges 144, 146 in the overlapped region 148.

By using TPO sheets with relatively thinner edges in the overlapped regions, the resulting coverstock may be operative to have a thickness at the overlapped region which corresponds to the thickness of the coverstock at positions where the TPO sheets do not overlap. In the exemplary embodiment, the TPO sheets or other top layer sheets may be extruded to include these exemplary thinner edges. In other exemplary embodiments, the edges of the TPO sheets may be thinned in the overlapped region prior to lamination. Such thinning of the edges may be achieved by cutting each edge to include a relatively thinner contour.

In further exemplary embodiments the substrate layer may be formed or cut to include a thinner portion such as a groove or recess adjacent the overlapped region of the TPO sheets. The groove or recess of the substrate may receive the bulge produced by the TPO sheets in the overlapped region resulting in a coverstock that has a generally uniform thickness within and adjacent the overlapped region.

Figure 10:
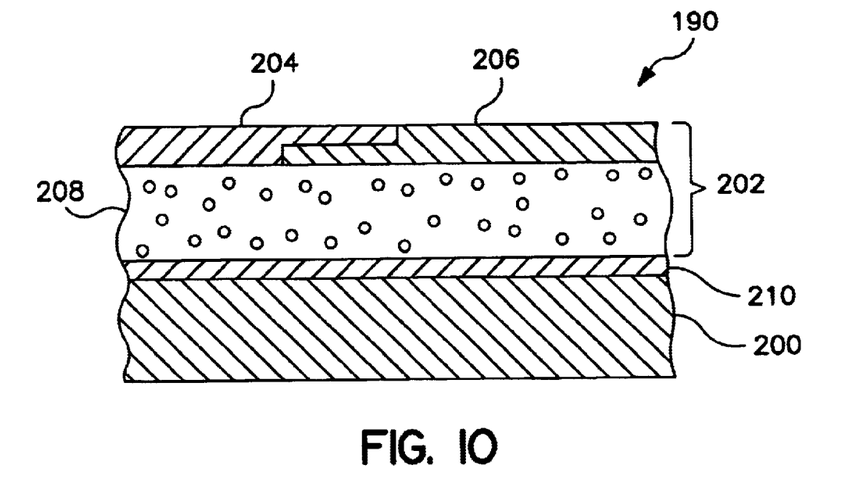
FIG. 10 is a side cross-sectional view representative of a multicolored coverstock mounted to a part.

In the exemplary embodiment the resulting coverstock may be applied to the surfaces of various workpieces such as automotive interior trim parts. In exemplary embodiments of the present invention the coverstock may be applied to a workpiece through vacuum forming, low pressure molding, compression molding and/or combinations of vacuum forming, low pressure molding and compression molding. FIG. 10 shows an example of a portion of a finished interior trim part 190 which includes an exemplary multicolored coverstock of the present invention. The finished part may correspond to a door panel, instrument panel, console, sun visor, seating, or any other interior trim part of an automobile or other vehicle.

Here the part 190 includes an embossed multicolored coverstock 202 applied to a rigid substrate 200. As discussed previously, the coverstock 202 may include two or more multicolored TPO sheets 204, 206 laminated to a foam substrate 208. The rigid substrate 200 may be comprised of a rigid thermoplastic such as acrylonitrile-butadiene-styrene (ABS), polycarbonate, or polypropylene. To prevent thermal degradation to the coverstock, exemplary embodiments of the part 190 may further include a thermal barrier film layer 210 between the coverstock 202 and the rigid substrate 200.

The multicolored coverstock of this invention is capable of being heat sealed and thus may be used for applications other than automotive interiors. For example, the coverstock can also be used as a cover for notebooks, calendars, and the like.

Thus the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A multi-colored coverstock comprising:
   at least one foam substrate; and
   at least two thermoplastic sheets, wherein each of the at least two sheets includes a different visual characteristic, wherein the at least two sheets are laminated to the foam substrate such that a first edge of a first one of the at least two sheets is overlapped by a second edge of a second one of the at least two sheets, wherein the at least two sheets include an uninterrupted embossed pattern that spans the first and second edges.

2. The coverstock according to claim 1, wherein the different visual characteristics include the first one of the at least two sheets having a different color than the second one of the at least two sheets.

3. The coverstock according to claim 1 wherein the first edge includes a plurality of notches, wherein each of the notches is overlapped by the second edge.

4. The coverstock according to claim 1 wherein the first edge and the second edge include correspondingly dovetailed edge contours.

5. The coverstock according to claim 1, wherein the first edge and the second edge include mirrored, tapered contours.

6. The coverstock according to claim 1, wherein the first edge is relatively thinner than adjacent portions of the first one of the at least two sheets.

7. The coverstock according to claim 1, wherein the second edge is relatively thinner than adjacent portions of the second one of the at least two sheets.

8. The coverstock according to claim 1, wherein the first and second edges are overlapped by at least about 2 mm and by at most about 3 mm.

9. The coverstock according to claim 1, wherein the at least two sheets are comprised of a thermoplastic olefin (TPO).

10. The coverstock according to claim 1, wherein the at least two sheets are comprised of a polyvinylchloride (PVC).

11. The coverstock according to claim 1 wherein the at least one foam substrate is comprised of a polyolefin foam.

12. The coverstock according to claim 1 wherein the embossed surface includes an uninterrupted pattern that spans each thermoplastic sheet.

13. An interior trim coverstock comprised of:
   at least two differently colored and partially overlapped thermoplastic sheets laminated to a flexible substrate, wherein outer surfaces of the thermoplastic sheets include an uninterrupted embossed pattern which spans across each thermoplastic sheet.

14. The interior trim coverstock according to claim 13, wherein the substrate includes a polyolefin foam.

15. The interior trim coverstock according to claim 13, wherein the substrate includes a textile.

16. The interior trim coverstock according to claim 13 wherein the thermoplastic sheets include a thermoplastic olefin (TPO).

17. The interior trim coverstock according to claim 13 wherein the thermoplastic sheets include a polyvinylchloride (PVC).

* * * * *